US008838299B2

(12) United States Patent
Deker et al.

(10) Patent No.: US 8,838,299 B2
(45) Date of Patent: Sep. 16, 2014

(54) METHOD OF DECOUPLING THE MODE OF AUTOMATIC FOLLOWING OF THE LATERAL PROFILE AND THE MODE OF AUTOMATIC FOLLOWING OF THE VERTICAL PROFILE

(75) Inventors: Guy Deker, Cugnaux (FR); Manuel Gutierrez-Castaneda, Toulouse (FR)

(73) Assignee: Thales, Neuilly sur Seine (FR)

(*) Notice: Subject to any disclaimer, the term of this patent is extended or adjusted under 35 U.S.C. 154(b) by 1107 days.

(21) Appl. No.: 12/328,683

(22) Filed: Dec. 4, 2008

(65) Prior Publication Data
US 2009/0177341 A1 Jul. 9, 2009

(30) Foreign Application Priority Data

Dec. 4, 2007 (FR) ..................... 07 08455

(51) Int. Cl.
*G05D 1/00* (2006.01)
*G05D 1/10* (2006.01)

(52) U.S. Cl.
CPC .............. *G05D 1/0061* (2013.01); *G05D 1/101* (2013.01)
USPC ...... 701/11; 701/4; 701/8; 244/175; 244/196; 244/197

(58) Field of Classification Search
CPC . G05D 1/0061; G05D 1/0202; G05D 1/0808; G05D 1/10; G05D 1/101
USPC ................. 701/3–5, 8, 11; 244/75.1, 76, 177, 244/179–181, 196, 197, 175
See application file for complete search history.

(56) References Cited

U.S. PATENT DOCUMENTS

| | | | | |
|---|---|---|---|---|
| 5,337,982 A * | 8/1994 | Sherry | .......................... | 244/186 |
| 5,978,715 A * | 11/1999 | Briffe et al. | ...................... | 701/11 |
| 6,085,129 A * | 7/2000 | Schardt et al. | ................... | 701/14 |
| 6,163,744 A * | 12/2000 | Onken et al. | ....................... | 701/3 |
| 6,317,659 B1 * | 11/2001 | Lindsley et al. | ............... | 244/175 |
| 6,405,124 B1 * | 6/2002 | Hutton | .......................... | 701/467 |
| 7,024,287 B2 * | 4/2006 | Peckham et al. | .................. | 701/3 |
| 7,188,007 B2 * | 3/2007 | Boorman et al. | .................. | 701/3 |
| 2005/0261809 A1 * | 11/2005 | Artini | ............................... | 701/3 |
| 2005/0261812 A1 * | 11/2005 | Artini et al. | ..................... | 701/16 |
| 2005/0273249 A1 * | 12/2005 | Artini et al. | .................... | 701/120 |
| 2006/0149432 A1 * | 7/2006 | Robinson | ........................... | 701/3 |
| 2008/0097658 A1 * | 4/2008 | Shue et al. | ........................ | 701/8 |

FOREIGN PATENT DOCUMENTS

| | | |
|---|---|---|
| EP | 1598641 A | 11/2005 |
| WO | WO-2004/008266 A | 1/2004 |
| WO | WO-2007/018572 A | 2/2007 |

* cited by examiner

*Primary Examiner* — Helal A Algahaim
*Assistant Examiner* — Donald J Wallace
(74) *Attorney, Agent, or Firm* — Stroock & Stroock & Lavan LLP

(57) ABSTRACT

The present invention relates to a method of decoupling the mode of automatic following of the lateral profile and the mode of automatic following of the vertical profile of an automatic guidance system of an aircraft (A) flying on a reference trajectory (T). The mode of automatic following of the vertical profile is not disengaged immediately on disengaging the mode of automatic following of the lateral profile. After disengaging the mode of automatic following of the lateral profile, the mode of automatic following of the vertical profile is disengaged automatically only if at least one criterion of lateral separation between the current or short-term position of the aircraft and the lateral profile corresponding to the reference trajectory is satisfied, having regard to the position error.

7 Claims, 2 Drawing Sheets

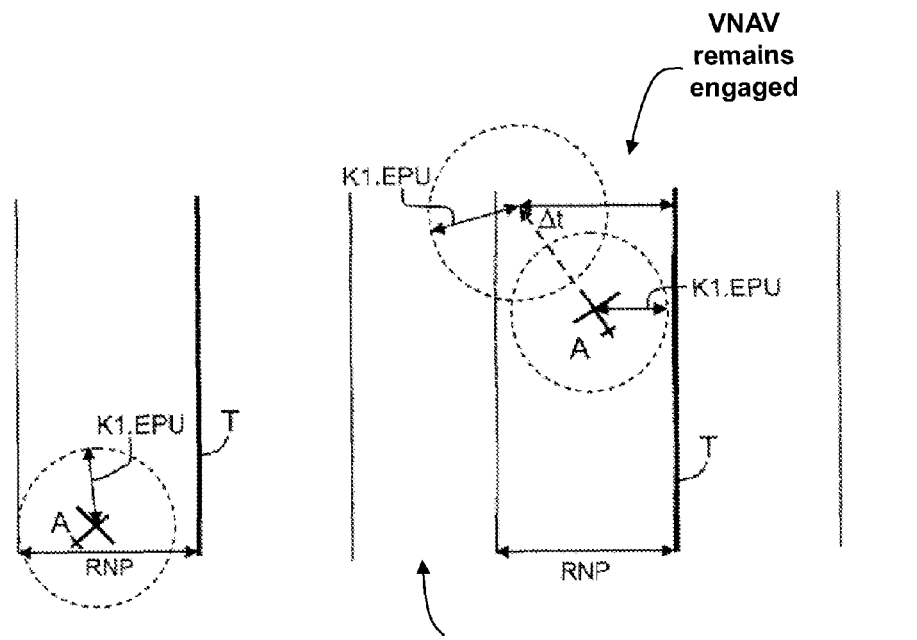
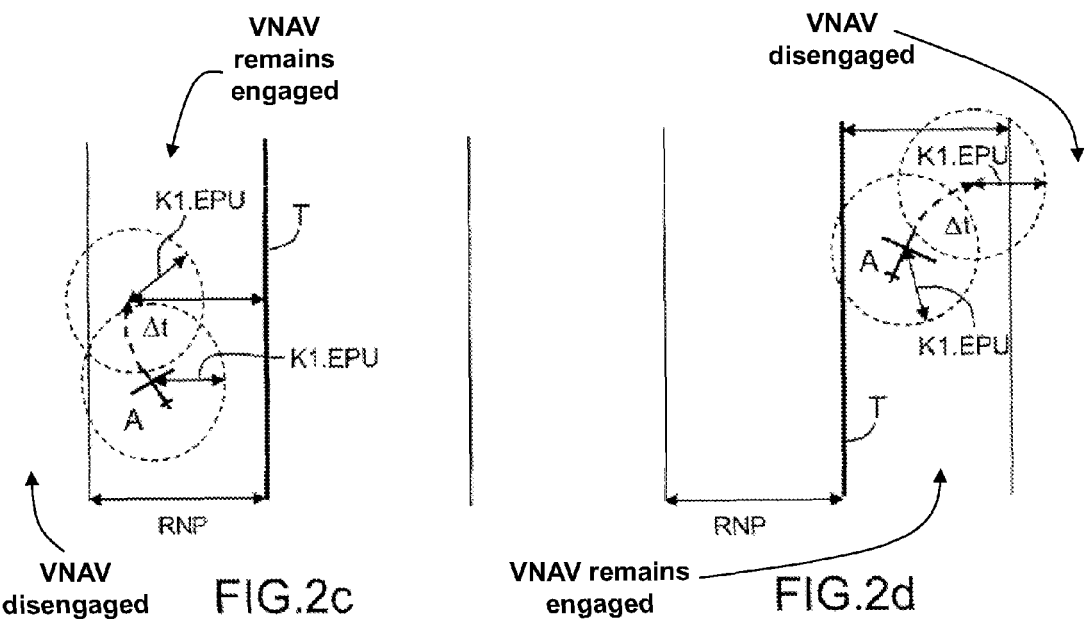

METHOD OF DECOUPLING THE MODE OF AUTOMATIC FOLLOWING OF THE LATERAL PROFILE AND THE MODE OF AUTOMATIC FOLLOWING OF THE VERTICAL PROFILE

This application claims priority under 35 U.S.C. §119 from French patent application No. 0708455 filed with the French Patent Office on Dec. 4, 2007, which is incorporated herein by reference in its entirety.

TECHNICAL FIELD

The present invention relates to a method of decoupling the mode of automatic following of the lateral profile and the mode of automatic following of the vertical profile of an automatic guidance system of an aircraft flying on a reference trajectory. It applies for example in the field of flight management systems.

PRIOR ART AND TECHNICAL PROBLEM

A flight plan is the detailed description of the route that must be followed by an airplane within the framework of a planned flight. The flight plan comprises notably a chronological sequence of waypoints described by their position, their altitude and their overflight time. The waypoints constitute a reference trajectory to be followed by the pilot of the airplane if he wishes to best comply with his flight plan. But this reference trajectory is also a valuable aid to the ground control personnel. It allows them to anticipate the movements of the airplane and thus ensure an optimum safety level, notably within the framework of maintaining the inter-aircraft separation criteria. The flight plan is commonly managed aboard civil airplanes by a system referred to as the "Flight Management System", which will be called the FMS subsequently. An FMS makes the reference trajectory available to the onboard personnel and to the other embedded systems.

Essentially with a view to safety, it is therefore necessary to ensure that the airplane follows at least in geographical terms and optionally in scheduling terms the reference trajectory described in the flight plan. For this purpose, guidance procedures make it possible to slave the airplane to a lateral profile and to a vertical profile that are contained in the reference trajectory. For example, in so-called "managed" mode, the automatic pilot formulates maneuvers on the basis of the reference trajectory made available by the FMS and executes them automatically so as to follow as closely as possible in three-dimensional space the trajectory corresponding to the reference trajectory. However, in the terminal zones with high traffic density or in the approach, controllers usually prefer to ensure guidance themselves on the basis of heading and speed instructions, so as to ensure optimum separation in real time. Moreover, in certain situations, it is preferable or indeed indispensable to veer from the reference trajectory. For example, the reference trajectory may cause the airplane to cut across another aircraft, violating the lateral separation criteria. From his ground control center, the traffic controller in charge of flight, separation and anticollision with other airplanes, anticipates in advance and forestalls the potential risks since he is cognizant of the whole of the aerial situation within a wide perimeter around the aircraft that he is controlling. He then implements pre-established procedures for coordination between the ground and the craft, these procedures commonly being grouped together under the name "Radar Vectoring". "Radar Vectoring" procedures can make it possible to ensure that two aircraft cross under optimum safety conditions. They are based on a set of guidance instructions or "directives", also predefined, that the controller passes to the pilot. These directives are improperly grouped together under the name "clearance". The pilot then disengages the functions of automatic following of the reference trajectory and manually executes the guidance directives that he receives from the controller, one after another, each time confirming their execution to the controller. Very often, the directives are exclusively passed verbally by VHF radio, the pilot confirming execution by phone also, although certain recent systems use digital data links in parallel to exchange a few guidance directives.

For example, the controller controlling the flight under radar guidance in a terminal zone or on the approach and not being precisely aware of the airplane's envisaged trajectory, will give the pilot a directive for following a heading complying with the traffic separation requirement without however needing to deviate overly from the trajectory calculated by the FMS. The pilot must then disengage the mode of automatic following of the lateral profile, so as to manually follow the heading directive given by the controller. For this purpose, current solutions require him to simultaneously disengage the mode of automatic following of the lateral profile and the mode of automatic following of the vertical profile, the lateral profile and the vertical profile forming part of the reference trajectory. Specifically, the vertical profile being constructed on the basis of the lateral profile, it seems obvious that following the vertical profile makes no sense if the lateral profile is no longer followed. It is even probable that the vertical profile rapidly becomes impossible to follow if the lateral profile is no longer followed. The FMS according to the prior art therefore requires that the airplane be slaved to the lateral profile so as to be able to follow the vertical profile. It must be understood that the lateral profile presents a particular benefit for the ground controller in his tasks of maintaining the inter-aircraft separation criteria. Whereas the vertical profile presents rather more a particular benefit for the pilot in his flight optimization logic in terms of kerosene consumption, passenger comfort and flight time so as to comply with his landing slot. In the approach zone for example, the controller guides the airplane while favoring lateral directives, even though he tries to follow the other constraints of the flight plan as far as possible as regards the safety of flights in the approach zone.

But on the one hand, the pilot may be hampered in anticipating and optimizing the end of his flight when he no longer has the assistance of the vertical profile automatic following mode. As long as he has not received any specific instruction from the controller, this generally being the case, the pilot is left somewhat to himself in the choice of his vertical flight strategy in manual. Moreover, the FMS continues to make predictions on the vertical profile, making the assumption that the vertical profile of the reference trajectory will be recovered at the earliest, that is to say a recovery maneuver will be triggered immediately, although this is not the case. Thus, in addition to the fact that the predictions are false, the FMS is unnecessarily burdened since it permanently recalculates a recovery trajectory. It is therefore apparent that this operational logic combined with the simultaneous disengagement according to the prior art of the mode of automatic following of the lateral profile and of the mode of automatic following of the vertical profile give rise to a loss of predictability regarding the vertical profile, regarding the speed profile and regarding the flight time, an unnecessary overburdening of the FMS and a loss of anticipation for the pilot.

Additionally, it sometimes happens that the controller changes his mind and dispatches a "resume route" directive so as to return the airplane to its reference trajectory. In this case, the fact that the lateral profile is no longer followed turns out to be particularly regrettable from the pilot's point of view.

RESTATEMENT OF THE CLAIMS

The aim of the invention is notably to remedy the aforesaid drawbacks. For this purpose, the invention proposes that the mode of automatic following of the vertical profile not be immediately disengaged when the mode of automatic following of the lateral profile is disengaged. Since very often, the requested heading more or less follows the lateral profile of the reference trajectory, making it possible in practice to continue to follow the optimized vertical profile for a certain time. Often the controller leaves the pilot a certain margin in altitude. He sometimes even leaves the pilot free to choose his vertical profile as long as he follows the lateral directives. Thus, the invention proposes that the vertical mode be disengaged later, only when the airplane has deviated from its reference trajectory to a distance such that to rejoin it would engender a deviation in flight time and distance that would require complete recalculation of the vertical profile. For this purpose, the subject of the invention is a method of decoupling the mode of automatic following of the lateral profile and the mode of automatic following of the vertical profile of an automatic guidance system of an aircraft flying on a reference trajectory. The mode of automatic following of the vertical profile is not disengaged on disengaging the mode of automatic following of the lateral profile. After disengaging the mode of automatic following of the lateral profile, the mode of automatic following of the vertical profile is disengaged automatically only if at least one criterion of lateral separation between the aircraft and the lateral profile corresponding to the reference trajectory is satisfied.

For example, after disengaging the mode of automatic following of the lateral profile, the mode of automatic following of the vertical profile may be disengaged automatically only if the aircraft is liable to deviate from the lateral profile corresponding to the reference trajectory by a distance that is greater than a given threshold.

Advantageously, the distance by which the aircraft is liable to deviate from the lateral profile can be calculated by firstly estimating the current position of the aircraft, on the basis of its measured position to which can be added the precision error liable to make it deviate to the maximum from the lateral profile. Then, it is possible to estimate the position of the aircraft after a period $\Delta t$ if, on starting from its current position, it maintains its speed and/or its angle of roll constant during the period $\Delta t$. Finally, it is possible to estimate the distance between the position of the aircraft after the period $\Delta t$ and the point of the lateral profile situated at the same altitude.

In an embodiment, after disengaging the mode of automatic following of the lateral profile, the mode of automatic following of the vertical profile can be disengaged automatically if the aircraft is at a distance from the lateral profile that is greater than the distance threshold. The mode of automatic following of the vertical profile can also be disengaged automatically if the aircraft strays from the lateral profile so that after the period $\Delta t$ it will be at a distance from the lateral profile that is greater than the threshold.

The object of the invention is also a method of decoupling the mode of automatic following of the lateral profile and the mode of automatic following of the vertical profile of an automatic guidance system of an aircraft flying on a reference trajectory. The mode of automatic following of the vertical profile is engaged automatically if the mode of automatic following of the lateral profile is about to be engaged and if a criterion of lateral proximity between the aircraft and the lateral profile corresponding to the reference trajectory is satisfied.

For example, the mode of automatic following of the vertical profile can be engaged automatically if the aircraft is liable to approach the lateral profile corresponding to the reference trajectory by a distance that is less than a given threshold.

Advantageously, the distance by which the aircraft is liable to approach the lateral profile can be calculated by estimating the current position of the aircraft, on the basis of its measured position to which is added the precision error liable to make it approach to the maximum the lateral profile. Then, it is possible to estimate the position of the aircraft after a period $\Delta t$ if, on starting from its current position, it maintains its speed and/or its angle of roll constant during the period $\Delta t$. Finally, it is possible to estimate the distance between the position of the aircraft after the period $\Delta t$ and the point of the lateral profile situated at the same altitude.

In an embodiment, the mode of automatic following of the vertical profile can be engaged automatically if the aircraft is at a distance from the lateral profile that is less than the distance threshold or if the aircraft approaches the lateral profile so that after the period $\Delta t$ it will be at a distance from the lateral profile that is less than the threshold.

The subject of the invention is also a method of decoupling the mode of automatic following of the lateral profile and the mode of automatic following of the vertical profile of an automatic guidance system of an aircraft flying on a reference trajectory implementing the two methods previously described.

ADVANTAGES

In addition to the benefit of flying an optimized vertical profile for a long time and of decreasing the pilot's loss of anticipation, the main advantages of the invention are furthermore that it allows better command of the arrival time in the case where the airplane has a time constraint on arrival, a scenario that will become increasingly frequent with the densification of air traffic. Conversely, the invention can also make it possible, on the basis of the same function implementing the same operational logic according to the invention, to anticipate the engagement of the lateral following mode so as to engage the vertical following mode in advance, when the lateral following mode is about to be engaged.

DESCRIPTION OF THE FIGURES

Other characteristics and advantages of the invention will become apparent with the aid of the description which follows in relation to appended drawings which represent:

FIGS. 2a, 2b, 2c and 2d, through schematics, examples of operational situations making it possible according to the invention to delay the disengagement of the mode of automatic following of the vertical profile or conversely to engage the mode of automatic following of the vertical profile in advance.

DESCRIPTION OF THE INVENTION ON THE BASIS OF THE FIGURES

Figure 1:
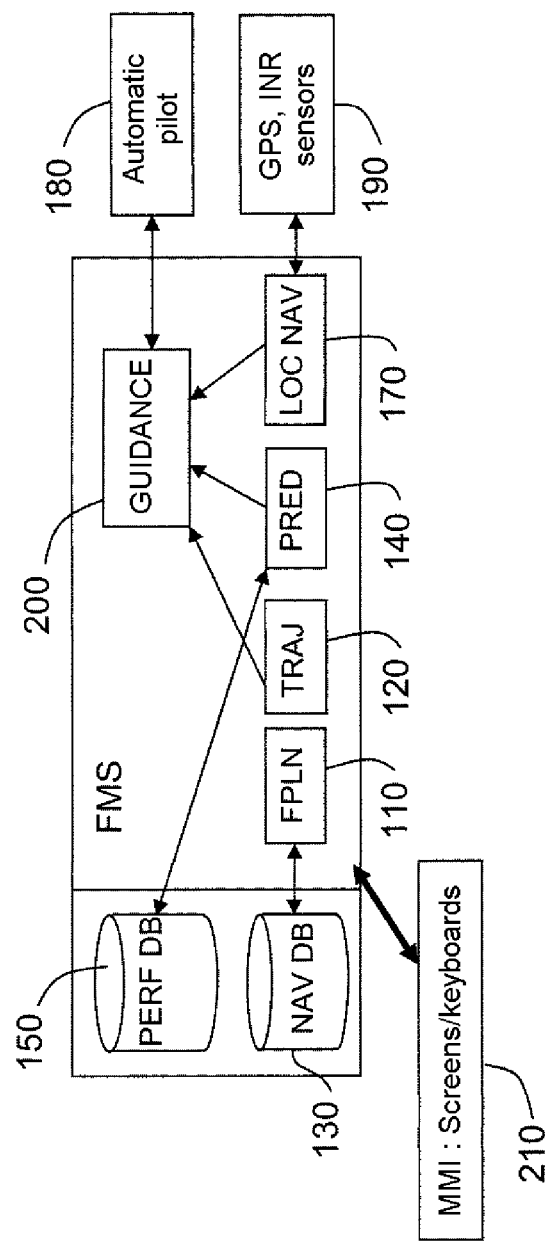
FIG. 1, through a diagram, an exemplary architecture of an FMS making it possible to implement the invention.

FIG. 1 illustrates through a diagram an exemplary architecture of an FMS making it possible to implement the invention. The invention can be implemented in a guidance module 200 using elements provided by a module 120 and by a module 140 as input. The module 120 provides elements of a reference trajectory. The module 140 provides prediction elements constructed on the basis of a flight plan provided by a module 110 on the basis of a performance database 150 and of a navigation database 130, as well as on the basis of the position and airplane state vector originating from a location module 170. The location module 170 uses position sensors 190, such as a GPS beacon and/or an inertial platform for example. The flight plan and the predictions are displayed to the pilot by way of a display module 210. The guidance module 200 dispatches to an automatic piloting module 180 requests to engage mode and sub-mode for guidance corresponding to the slaving loops for the automatic piloting module 180, as well as the directives or targets.

FIGS. 2a, 2b, 2c and 2d illustrate through schematics four operational situations encountered by an airplane A. The situations of FIGS. 2a, 2b, 2c and 2d allow the airplane A to delay according to the invention the disengagement of the mode of automatic following of the vertical profile, which according to the prior art is normally disengaged automatically when the automatic lateral mode is disengaged. A basic condition for permitting maintenance of the engaged vertical mode is that the airplane A does not deviate more than a certain distance from the reference trajectory T. However, in addition to the current position of the airplane A, it is also necessary to consider the current position error, as well as the position of the airplane A at a short-term time horizon $\Delta t$, so as to guarantee that the airplane A is not in the process of exiting a corridor centered on T, this corridor possibly being of RNP ("Required Navigation Performance") width for example. Exemplary embodiments are detailed hereinafter, in which:

the VNAV mode denotes the mode of automatic following of the vertical profile and the LNAV mode denotes the mode of automatic following of the lateral profile;

the "selected" mode denotes the mode of guidance on automatic pilot allowing the pilot to introduce a flight directive, such as for example a heading or speed directive, the automatic pilot monitoring and maintaining the directive value independently of the other flight parameters;

XTK ("Cross Track") denotes the lateral deviation in distance with respect to the reference trajectory T;

TKE ("Track Angle Error") denotes the angular deviation between the course angle corresponding to the airplane A and the course angle corresponding to the reference trajectory T;

XTK.TKE denotes the scalar product of XTK and TKE;

$\Phi$ denotes the angle of roll necessary to perform a turn;

$V_s$ denotes the ground speed;

g=9.81 m/s$^2$;

$K_1$ and $K_2$ denote respectively a gain in the lateral position error and a gain in the altitude error, which depend on the airplane context and on its convergent or divergent dynamics with respect to the reference trajectory T;

EPU is the acronym standing for "Estimated Position Uncertainty" and denotes a maximum error margin in the lateral position;

VEB is the acronym standing for "Vertical Error Budget" and denotes a maximum error margin in the altitude;

ALTVERT denotes the scheduled altitude provided on the vertical profile associated with the reference trajectory T;

ALTA denotes the altitude of the airplane A.

Thus, in an embodiment, the VNAV mode can remain engaged if:

the VNAV mode is engaged, and the LNAV mode was engaged and has just been disengaged for a mode of navigation selected in heading for example, and:

in the situation of FIG. 2a for example: the airplane A is approaching and converging towards the reference trajectory T (XTK.TKE<0), or in the situation of FIGS. 2b, 2c and 2d for example: the airplane A is straying and diverging from the reference trajectory T (XTK.TKE>0) but ought not to exit the corridor of RNP width in a time interval $\Delta t$ sufficient to allow the crew time to understand and react, that is to say:

in the situation of FIG. 2b for example:

the airplane A is not in a turn ($|\Phi|<3°$ for example), and the current position together with the lateral position error EPU and propagated by $\Delta t$ with the heading of the current speed vector does not exceed the RNP:

$|(XTK+K_1*EPU)+V_s*\Delta t*\sin(TKE)|\leq RNP$, or in the situation of FIG. 2c for example:

the airplane A is in a turn ($|\Phi|>3°$ for example), and the turn makes it reconverge: ITKEI decreases, and the minimum deviation of XTK in the turn (together with its lateral position error EPU) will be less than RNP, that is to say:

$|(XTK+K_1*EPU)+R*(1-\cos(TKE))|\leq RNP$ with $R=(V_s)^2/(g*\tan\Phi)$, or in the situation of FIG. 2d for example:

the airplane A is in a turn ($|\Phi|>1°$ for example), and the turn makes it diverge: ITKEI increases, and the propagation of the turn in progress assumed constant for a time $\Delta t$, from the current position together with the lateral position error EPU, gives a deviation XTK of less than RNP.

Otherwise, in the situations other than those illustrated by FIGS. 2a, 2b, 2c and 2d, the VNAV mode is disengaged.

The examples of operational situations illustrated by FIGS. 2a, 2b, 2c and 2d allow the airplane A conversely to re-engage in advance according to the invention the mode of automatic following of the vertical profile, which is normally engaged at the same time as the mode of automatic following of the lateral profile.

Thus, the VNAV mode can be engaged if:

the LNAV mode is not engaged, and the LNAV mode is armed, and in the situation of FIG. 2a for example: the airplane A is converging towards its reference trajectory (XTK.TKE<0) and its lateral position deviation is less than RNP, that is to say $|(XTK+K_1*EPU)|\leq RNP$, or in the situation of FIGS. 2b, 2c and 2d for example: the airplane A is diverging from its trajectory (XTK.TKE>0), and in the situation of FIG. 2b for example:

the airplane A is not in a turn ($|\Phi|<3°$ for example), and its deviation of maximum XTK, that is to say propagated by $\Delta T$ and together with its lateral precision error EPU, will remain less than RNP, that is to say:

$|(XTK+K_1*EPU)+V_s*\Delta t*\sin(TKE)|\leq RNP$, or in the situation of FIG. 2c for example:
the airplane is in a turn ($|\Phi|>3°$ for example), and its deviation of maximum XTK together with its lateral precision error EPU will remain less than RNP, that is to say:
$|(XTK+K_1*EPU)+R*(1-\cos(TKE))| \leq RNP$
with $R=(V_s)^2/(g*\tan\Phi)$ Otherwise, the VNAV mode is not engaged, notably in the situation illustrated by FIG. 2d.

In another embodiment, it is conceivable to engage the VNAV mode even if the pilot has not armed the LNAV mode, on condition that the airplane A can follow a vertical profile while being close to the reference trajectory T.

Thus, the VNAV mode can be engaged if:
the LNAV mode is neither armed nor engaged, and
the airplane A is vertically close to the reference trajectory T, that is to say for example:
$|ALTVERT-ALTA+K_2*VEBI|<1000$ feet, and
the airplane A is in one of the situations of FIG. 2a, 2b or 2c.

Otherwise, the VNAV mode is not engaged, notably in the situation illustrated by FIG. 2d.

Advantageously, in another embodiment, the complete decoupling of the LNAV and VNAV modes can be carried out by applying the above-described conditions of contained deviation and on condition that the lateral mode is armed.

Other Advantages:

The invention described above makes it possible to maintain the mode of following of an optimized vertical profile for a sufficient time such that the crew can prepare a new strategy making it possible to optimize the flight under the new conditions engendered by the guidance directive given by the controller. Ultimately, the principle according to the invention for following the position of the airplane around its lateral profile can permit a decoupling of the modes of automatic following of the vertical profile and lateral profile.

The invention claimed is:

1. A method of controlling automatic following of a lateral profile and automatic following of a vertical profile of an automatic guidance system of an aircraft flying on a reference trajectory, comprising the steps of:
disengaging automatic following of the lateral profile, while automatic following of the vertical profile remains engaged;
estimating a projected lateral deviation distance of the aircraft from the lateral profile corresponding to the reference; and
automatically disengaging automatic following of the vertical profile if the projected lateral deviation distance plus an associated lateral position error is greater than a predetermined threshold;
wherein estimating the projected lateral deviation distance comprises:
when the aircraft is not in a turn, estimating the projected lateral deviation distance by a function comprising propagating a current position of the aircraft by a predetermined time period along a current heading of the aircraft;
when the aircraft is in a turn that causes the aircraft to converge towards the reference trajectory, estimating the projected lateral deviation distance based on a maximum lateral deviation of the aircraft from the reference trajectory while in the turn; and
when the aircraft is in a turn that causes the aircraft to diverge from the reference trajectory, estimating the projected lateral deviation distance by a function comprising propagation of the turn over the predetermined time period from the current position of the aircraft.

2. The method as claimed in claim 1, wherein the step of calculating the lateral deviation distance further comprises the step of:
estimating the position of the aircraft after the predetermined time period if, on starting from the current position, the aircraft maintains its speed or angle of roll substantially constant during the predetermined time period.

3. The method as claimed in claim 2, wherein the step of disengaging automatically the automatic following of the vertical profile occurs if:
the aircraft is at a distance from the lateral profile corresponding to the reference trajectory that is greater than the predetermined threshold; or
the aircraft strays from the lateral profile corresponding to the reference trajectory so that after the predetermined time period the aircraft will be at a distance from the lateral profile corresponding to the reference trajectory that is greater than the predetermined threshold.

4. The method as claimed in claim 1, wherein the step of calculating the lateral deviation distance further comprises the step of:
estimating a distance between the position of the aircraft after the predetermined time period and a point of the lateral profile, corresponding to the reference trajectory, situated at a same altitude.

5. A method of controlling automatic following of a lateral profile and automatic following of a vertical profile of an automatic guidance system of an aircraft flying on a reference trajectory, wherein the automatic following of the vertical profile is engaged automatically if:
the mode of automatic following of the lateral profile is armed; and
a criterion of lateral proximity between the aircraft and the lateral profile corresponding to the reference trajectory is satisfied, the criterion comprising at least one of the following:
when the aircraft is converging towards the reference trajectory and a current deviation of a lateral position of the aircraft from the lateral profile, plus an associated lateral position error, is less than a predetermined threshold;
when the aircraft is diverging from the reference trajectory:
when the aircraft is not in a turn, a first projected lateral deviation distance computed according to a function comprising a current position of the aircraft propagated by the predetermined time period along a current heading of the aircraft, plus an associated lateral position error, is less than the predetermined threshold; and
when the aircraft is in a turn that causes the aircraft to converge towards the reference trajectory, a second projected lateral deviation distance computed according to a function comprising a maximum lateral deviation of the aircraft from the reference trajectory while in the turn, plus an associated lateral position error, is less than the predetermined threshold.

6. The method as claimed in claim 5, wherein a distance by which the aircraft is liable to approach the lateral profile corresponding to the reference trajectory is calculated by a method comprising the step of:
estimating the position of the aircraft after the predetermined time period if, on starting from the current position, the aircraft maintains its speed or angle of roll constant during the predetermined time period.

7. The method as claimed in claim 5, wherein a distance by which the aircraft is liable to approach the lateral profile corresponding to the reference trajectory is calculated by a method comprising the step of:

estimating a distance between the position of the aircraft after the predetermined time period and the point of the lateral profile, corresponding to the reference trajectory, situated at the same altitude.

* * * * *